United States Patent Office 2,851,426
Patented Sept. 9, 1958

2,851,426

METHOD AND COMPOSITION FOR INHIBITING CORROSION OF METALS

William B. Hughes, Webster Groves, Mo., assignor to Cities Service Research and Development Company, New York, N. Y., a corporation of New Jersey No Drawing. Application May 1, 1956
Serial No. 581,839

10 Claims. (Cl. 252—391)

This invention relates to inhibiting corrosion of metals, and is more particularly directed to improved compositions and processes for minimizing the corrosive effect of oil brine mixtures on oil field production and transmission equipment.

It is generally recognized that oil-producing formations often yield with the crude oil a brine which is extremely corrosive in its action upon the oil-producing and collecting equipment, including the metal tubing, casings, pumps, pipe lines, tanks and other storage equipment. This type of corrosion is particularly noticeable in wells producing brine which contain varying amounts of hydrogen sulfide, carbon monoxide, and other acidic materials.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide new and improved corrosion inhibiting compounds having properties and characteristics which make them uniquely effective in minimizing and reducing corrosion of metals.

It is another object of this invention to provide new corrosion inhibitors which are particularly effective in preventing corrosion in wells producing oil-brine, and in reducing corrosion in wells in which large amounts of brine are produced as compared to oil.

I have discovered that if a dibasic acid is reacted with monoethanolamine in the presence of phosphorus pentasulfide, an intermediate thiazoline structure is obtained having a free acid radical. If the acid group of the thiazoline is further reacted with polyamine anew thiazoline-imidazoline compound is obtained. These new thiazoline-imidazoline compounds I have found to be most effective corrosion inhibitors.

The intermediate thiazoline compound can be prepared if desired by first reacting 2-aminoethanol with a dicarboxylic acid in substantially equimolar quantities at a temperature of about 200° C. to provide an oxazoline. The oxazoline is obtained by removing two moles of water from the reaction mixture for each mol of acid used. Water removal is effected by azeotropic distillation using a solvent such as benzene, toluene, xylene or the like.

The thiazoline is then obtained by reacting the oxazoline with an excess of $P_2S_5$. Carrying out this reaction according to the method described by Morton in the "Chemistry of Heterocyclic Compounds," McGraw-Hill, p. 419, will effect substitution of S for O in the oxazoline thus providing the desired thiazoline compound.

In preparing the new compounds of my invention however, it is not necessary that the oxazoline compound be first formed and thereafter converted to the thiazoline. The preferred method is to utilize the $P_2S_5$ as a cyclizing agent and form the intermediate thiazoline compound, directly as is more fully described hereafter.

The structure of the thiazoline-imidazoline compounds which I have found to possess most effective corrosion inhibiting properties may generally be represented as follows:

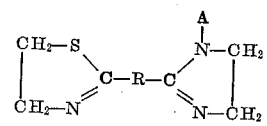

wherein R is the residue of a dibasic acid having from 2 to about 20 carbon atoms and A is one of the following: —H,

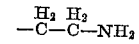

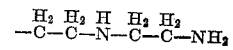

or

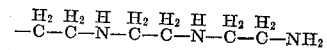

In preparing these new compounds, equimolar amounts of 2-aminoethanol and a selected dibasic acid are heated in the presence of an excess of phosphorous pentasulfide. The mixture is heated under reflux until approximately 2 mols of water are recovered for each mol of dibasic acid used. The temperature of the reflux will vary depending on the azeotrope forming solvent used. If benzene, toluene or xylene are used the temperature will range between approximately 80° C. and 150° C. respectively.

It is necessary to heat the mixture from about two to ten hours depending on the temperature at which heating is carried out. Heating at higher temperatures reduces the period of time necessary to obtain complete reaction.

After the recovery from the reaction zone of the theoretical amount of water obtained in forming the thiazoline ring, approximately 2 mols when 1 mol of acid is used, the azeotrope forming solvent is distilled from the reaction mixture. Excess phosphorous pentasulfide is removed from the intermediate thiazoline product by washing with water.

The intermediate thiazoline compound is then further reacted in an equimolar amount with a polyamine. Reaction is effected between the carboxyl group of the thiazoline and the amine, with formation of the imidazoline ring being accomplished by removing from the reaction zone approximately two moles of water for each mol of the intermediate thiazoline used. Water removal is accomplished by azeotropic distillation using a solvent such as those previously referred to.

In preparing these thiazoline-imidazoline compounds I have found that a dicarboxylic acid having from 2 to 20 carbon atoms is to be preferred. The acid selected may be saturated or unsaturated, having ring, straight or branched chain configuration and can include substituents such as hydroxyl groups. Among the acids which I have found to be particularly effective in preparing the thiazoline-imidazoline compounds of this invention are dimerized linoleic acid, generally referred to hereafter as dimer acid, oxalic, malonic, succinic, glutaric, adipic, pimelic, phthalic, terephthalic, suberic, azelaic, sebacic, tartronic, malic, citramalic, tartaric, dihydroxytartaric, mucic, tetrahydroxy adipic as well as other acids.

The amine compound condensed with the free acid group of the intermediate thiazoline compound to form the thiazoline-imidazoline, is preferably a polyamine such as ethylenediamine, diethylene triamine, triethylenetetramine or tetraethylene pentamine.

The intermediate thiazoline compounds having the free acid radical, are effective as corrosion inhibitors themselves, though not to the same degree as the thiazoline-imidazoline compounds. As shown in Table 1, the intermediate thiazoline compounds having the carboxyl group do possess corrosion inhibiting properties.

In order to more fully understand the manner in which the intermediate thiazoline compounds utilized in the preparation of the new thiazoline-imidazoline compounds are prepared and the protection they afford, Examples 1–5 are provided.

EXAMPLE 1

To 60 grams (1 mol) of 2-aminoethanol 600 grams (1 mol) of dimerized linoleic acid (dimer acid) were added together with 67 grams (0.3 mol) of phosphorous pentasulfide (M. W. 222) and 100 ml. of xylene. The mixture was heated for 90 minutes under reflux with water being removed by distillation of the azeotrope formed. When approximately 36 grams of water had been recovered representing 2 mols of water, the theoretical amount recoverable in forming the thiazoline ring, reflux was discontinued. The resulting product was a dark colored oil having a sulphurous odor. The reaction product was then washed with water. Water was removed by distillation with xylene, with the water being recovered in a water trap. After distillation of the xylene a final product was obtained having a molecular weight of 632. This product is identified as inhibitor No. 1 in Table 1.

EXAMPLE 2

Following the procedure set forth in Example 1, 60 grams of 2-aminoethanol were reacted with 102 grams of succinic acid. To the reaction mixture 67 grams of phosphorous pentasulfide and 100 ml. of xylene were added. The mixture was heated under reflux until approximately 2 mols of water had been recovered. After recovery of the theoretical amount of water indicating formation of the thiazoline ring, excess phosphorous pentasulfide was removed by water washing with water. Water was removed from the reaction product by xylene distillation in the form of a water-xylene azeotrope. Xylene was then removed from the reaction mixture leaving a yellow oily product having a molecular weight of 138. This product was tested as a corrosion inhibitor and provided the protection recorded in Table 1 for inhibitor 2.

EXAMPLE 3

Following the procedure set forth in Example 1, approximately 200 grams of sebacic acid was substituted for the dimer acid in Example 1. Other reactants in like molar quantities, as described in Example 1, were reacted under the same conditions to produce an oily reaction product having a yellow color and providing corrosion protection as indicated for inhibitor No. 3 in Table 1.

EXAMPLE 4

The reaction described in Examples 1 and 2 was repeated under the same conditions with 166 grams of terephthalic acid being used to form the thiazoline compound. Reaction was carried out in the presence of xylene with water being removed as an azeotrope. After recovery of approximately 2 mols of water, the reaction product was washed with water to remove excess phosphorous pentasulfide. Wash water was removed by azeotropic distillation. The xylene solvent was removed from the reaction product by distillation. The final reaction product was a pale yellow oil having a molecular weight of 201. The theoretical molecular weight for this reaction product is 206. The product, identified as inhibitor No. 4 in Table 1, provided 97.8 percent protection at 25 p. p. m.

EXAMPLE 5

Following the procedure set forth in Example 1, 20 grams (0.10 mol) of mucic acid was added to 6 grams (0.10 mol) of 2-aminoethanol together with 6.7 grams of phosphorous pentasulfide in the presence of approximately 50 ml. of xylene. The reaction mixture was heated for a period of about 6 hours with approximately 3.6 grams of water being recovered. This represents the theoretical amount of water recoverable from this reaction mixture in forming the thiazoline ring. After recovery of the water by azeotropic distillation, the product was washed with water and the wash water removed as an azeotrope. The oily product was then heated to distill the xylene solvent and provide a reaction product, which, when tested as a corrosion inhibitor, provided the results indicated for inhibitor No. 5 in Table 1.

The effectiveness of the reaction products obtained in the foregoing examples which are the intermediate reaction products utilized in the preparation of the thiazoline-imidazoline compounds, the preparation of which is more specifically described hereafter, was tested in inhibiting corrosion according to the method hereafter described. The text utilizes prepared brines, which substantially duplicate corrosion conditions met in oil field operations. While the tests were conducted primarily on these prepared brines, it is, of course, understood that the compounds of my invention may be utilized under a wide variety of corrosion conditions. This test is generally referred to as a static test since no movement of test strips is made after the test strip has been immersed in the brine. This is to be contrasted with the dynamic test described in my copending application Ser. No. 552,264, filed December 12, 1955, wherein the test strip is continuously dipped in the corrosive brine over a fixed period of time.

The test procedure used herein involved a measurement of the corrosive action of a hypothetical well fluid as inhibited with compositions described above upon weighed, cleaned and polished strips of number 18 gauge, cold rolled steel measuring one-quarter inch by four inches, under conditions closely approximating those existing in a producing well and a comparison thereof with the results obtained by subjecting identical strips to the corrosive action of the hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosion inhibitor being tested was added to each flask in amounts ranging from 10 to 25 p. p. m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus a protection percent may be calculated for each of the test strips taken from the inhibited test fluids in accordance with the following formula:

$$\frac{L1-L2}{L1} \times 100 = \text{percent protection}$$

in which L1 is the loss in weight of strips taken from uninhibited test fluids, and L2 is the loss in weight of strips which were subjected to inhibited test fluids.

Following the procedure outline above, the compounds prepared according to Examples 1 through 5 were tested as corrosion inhibitors. The results of these tests are recorded in Table 1, which follows. The tests clearly indicate the effectiveness of the intermediate thiazoline acid structures in providing protection against corrosion in the presence of corrosive brines.

Table 1

| Inhibitor No. | Acid Used | Percent Protection | | |
|---|---|---|---|---|
| | | 25 p. p. m. | 10 p. p. m. | 5 p. p. m. |
| 1 | Dimer | 95.2 | 90.0 | 76.4 |
| 2 | Succinic | 92.4 | 89.3 | 61.0 |
| 3 | Sebacic | 91.8 | 80.3 | 42.1 |
| 4 | Terephthalic | 97.8 | 94.1 | 90.3 |
| 5 | Mucic | 90.0 | 61.8 | 22.9 |

To prepare the thiazoline-imidazoline compounds which I found possess unexpected and superior corrosion inhibiting properties the intermediate thiazoline compounds prepared according to Examples 1–5 were used. Preparation of the thiazoline-imidazolines is described in the following examples.

EXAMPLE 6

To 63.2 grams (0.1 mol) of the compound prepared according to Example 1, 10.3 grams (0.1 mol) of diethylenetriamine was added in the presence of 600 ml. of xylene. The reaction mixture was heated in a decanter type still with water being removed as an azeotrope. Xylene solvent was continuously returned to the reaction zone. When 3.6 grams (0.2 mol) of water had been recovered from the reaction mixture, xylene was removed by distillation and the reaction product heated to a temperature of about 280° C. The final reaction product had a molecular weight of 698. This is to be compared with a theoretical molecular weight value of 705. This thiazoline-imidazoline compound is identified as inhibitor No. 1 in Table 2, which follows.

EXAMPLE 7

In a similar manner, 14 grams of the intermediate product obtained according to Example 2 was reacted with 10.3 grams of diethylenetriamine in the presence of approximately 100 ml. of xylene. The reaction mixture was heated to a temperature of about 145° C. to distill from the reaction mixture water produced by the formation of the imidazoline ring. When approximately 0.2 mol of water had been recovered from the reaction mixture, the xylene azeotrope forming solvent was removed from the reaction mixture. The reaction mixture was heated to approximately 280° C. to insure formation of the imidazoline ring. The final reaction product had a molecular weight of 205 and is identified as inhibitor No. 2 in Table 2.

EXAMPLE 8

According to the method defined in Examples 6 and 7, above, the intermediate compound prepared according to Example 4, was reacted with diethylenetriamine in substantially equimolar quantities. 2 mols of water were removed from the reaction mixture by azeotropic distillation to produce a compound having a molecular weight of 270. The product, a brown viscous oil having a pungent odor, had a molecular weight value of 270. This compound was tested as a corrosion inhibitor and provided at 25 p. p. m., 99.8 percent protection according to the method previously described. The final reaction product is identified as inhibitor No. 4 in Table 2.

EXAMPLE 9

Following the procedure described in Example 6 above, 13.8 grams of the product obtained according to Example 2 was reacted with 6.2 grams of ethylenediamine in the presence of xylene with 3.6 grams of water being recovered from the reaction mixture by azeotropic distillation. After removal of the xylene solvent a brown oil was obtained. This product had a molecular weight of 160 as compared to a theoretical molecular weight value of 164. The compound is identified as inhibitor No. 7 in Table 2.

EXAMPLE 10

According to the method described in Example 6, 20.6 grams of the reaction product obtained according to Example 4, was reacted with 6.2 grams of ethylenediamine in the presence of 50 ml. of xylene. After removal of approximately 3.6 grams of water, xylene was distilled from the reaction mixture and a dark colored liquid obtained. This final reaction product had a molecular weight of 226 determined according to the method of Rast. (Ber. 55, 1051, 3727, 1922). This compound is identified as inhibitor No. 9 in Table 2.

EXAMPLE 11

To 63.8 grams of the product obtained according to Example 1, 14.6 grams of triethylene tetramine was added and the mixture heated in the presence of a xylene azeotrope forming solvent at a temperature of about 145° until approximately 3.6 grams of water was recovered. After recovery of this 0.2 mol of water the xylene was distilled from the reaction mixture leaving a dark colored final reaction product having a molecular weight of 650. The theoretical molecular weight value for this compound is 648. The compound was tested as a corrosion inhibitor and is identified as inhibitor No. 11 in Table 2.

EXAMPLE 12

As described in Example 6, a final reaction product was obtained by reacting 14 grams of the product obtained according to Example 2, with 14.6 grams of triethylene tetramine in the presence of a xylene solvent. The mixture was refluxed for a sufficient period of time at approximately 145° C. to recover 0.2 mol of water indicating the formation of the imidazoline ring. The final reaction product was a dark, viscous liquid having a molecular weight of 247 as compared to a theoretical molecular weight value of 250. This final reaction product is identified as inhibitor No. 12 in Table 2.

EXAMPLE 13

63 grams (0.1 mol) of the reaction product obtained according to Example 1 was reacted according to the method described in Example 6 with approximately 19 grams (0.1 mol) of tetraethylene pentamine. After recovery of approximately 3.6 grams of water, a final reaction product was obtained having a dark brown color and a molecular weight according to the method of Rast of 778. The theoretical molecular weight for this compound is 793. This product was tested as a corrosion inhibitor and produced the results recorded for inhibitor No. 16 in Table 2.

EXAMPLE 14

14 grams of the product obtained according to Example 2 was reacted, as described in Example 6, with 19 grams of tetraethylene pentamine to produce after recovery of approximately 0.2 mol of water by azeotropic distillation, a viscous final reaction product having a molecular weight of 190. This final reaction product is identified as inhibitor No. 17 in Table 2.

EXAMPLE 15

Following the method of preparing thiazoline-imidazoline compounds as set forth in Example 6, 20 grams of the reaction product obtained according to Example 4 was reacted with 19 grams of tetraethylene pentamine. Water was removed from the reaction mixture by azeotropic distillation of the mixture with 100 ml. of xylene. After recovery of 0.2 mol (36 grams) of the water, indicating formation of the imidazoline ring, xylene was distilled from the reaction mixture leaving a final reaction product whose molecular weight was determined to be 305 according to the method of Rast. This product is identified as inhibitor No. 19 in Table 2.

Following the test procedure previously outlined, the compounds prepared according to Examples 6–15 were tested as corrosion inhibitors. The results of these tests are provided in Table 2 which follows. The effectiveness of these compounds will be clearly evident from a review of the results recorded in this table.

Table II

| Inhibitor | Acid | Polyamine | Percent Protection | | |
|---|---|---|---|---|---|
| | | | 25 p. p. m. | 10 p. p. m. | 5 p. p. m. |
| 1 | Dimer | DETA | 98.3 | 96.4 | 88.1 |
| 2 | Succinic | DETA | 99.4 | 93.8 | 70.4 |
| 3 | Sebacic | DETA | 95.8 | 90.0 | 50.3 |
| 4 | Terephthalic | DETA | 99.8 | 97.8 | 93.6 |
| 5 | Mucic | DETA | 92.1 | 73.9 | 48.6 |
| 6 | Dimer | EDA | 89.9 | 74.6 | 67.8 |
| 7 | Succinic | EDA | 92.1 | 88.8 | 71.3 |
| 8 | Sebacic | EDA | 86.8 | 83.4 | 73.8 |
| 9 | Terephthalic | EDA | 93.8 | 89.3 | 29.8 |
| 10 | Mucic | EDA | 70.8 | 61.2 | ---- |
| 11 | Dimer | TETA | 99.1 | 96.8 | 95.6 |
| 12 | Succinic | TETA | 99.8 | 98.9 | 93.7 |
| 13 | Sebacic | TETA | 99.1 | 95.3 | 93.2 |
| 14 | Terephthalic | TETA | 97.9 | 94.2 | 91.6 |
| 15 | Mucic | TETA | 99.8 | 98.6 | 94.2 |
| 16 | Dimer | TEPA | 99.1 | 90.6 | 88.1 |
| 17 | Succinic | TEPA | 98.8 | 97.8 | 93.2 |
| 18 | Sebacic | TEPA | 98.8 | 94.1 | 89.4 |
| 19 | Terephthalic | TEPA | 98.4 | 93.6 | 87.5 |
| 20 | Mucic | TEPA | 97.3 | 94.1 | 87.3 |

In using the new compounds of my invention for protecting metal surfaces, including piping, casing, storage equipment, and other metal surfaces, which come in contact with corrosive fluids, I have found that excellent results are obtained by injecting a small but appropriate quantity of the selected inhibitor. Injection of substantial quantities of inhibitor, for example 10–20%, would provide substantially increased protection, but could probably not be justified economically. Generally, not more than 1500 to 2000 p. p. m. of the inhibitor will be used in the corrosive liquid coming in contact with the metal surface. Under certain conditions, however, greater quantities of inhibitor may be necessary. When treating producing wells, I often use not more than about 200 p. p. m. of the selected corrosion inhibiting compound, and inject the same into the producing well so that the inhibitor can mingle with the oil brine mixture and come in contact with the producing equipment. If desired, the inhibiting compounds may be introduced directly into the top of the casing, either with or without inert carriers, such as kerosene, gas oil or other oils of similar composition, and be permitted to flow down into the well position and then back through the tubing and into related apparatus. I have found that if this procedure is followed, substantial reduction in corrosion throughout the entire producing and collecting system may be obtained.

The nature of the inhibiting action of the improved compositions of my invention, is not fully understood but apparently the thiazoline-imidazoline structures preferentially wet the surface of the metal, thus excluding the corrosive material or fluid from coming in contact with the metal. In any event, however, despite the lack of a complete understanding of the mechanics of the protective effect obtained, the new compounds of my invention are extremely and surprisingly effective in protecting metallic surfaces, particularly oil well and oil field equipment, from corrosion.

It is to be understood that the improved compositions of my invention are not limited to use alone or singly and may be applied along with other agents commonly introduced into producing wells for breaking emulsions, preventing scale formation, minimizing pitting, etc. It is further evident that my invention is not restricted to the use of improved compositions for inhibiting corrosion in oil wells, but may be employed to perform this function in the presence of corrosive fluids derived from many other sources.

What I claim is:

1. As a new composition of matter, a compound having the formula

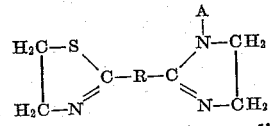

wherein R is a divalent hydrocarbon radical having from 2 to 20 carbon atoms, and A is a member of the group consisting of: H, $$\begin{array}{cc} H_2 & H_2 \\ -C-C-NH_2 \end{array}$$

$$\begin{array}{ccccc} H_2 & H_2 & H & H_2 & H_2 \\ -C-C-N-C-C-NH_2 \end{array}$$

$$\begin{array}{cccccccc} H_2 & H_2 & H & H_2 & H_2 & H & H_2 & H_2 \\ -C-C-N-C-C-N-C-C-NH_2 \end{array}$$

2. As a new composition of matter, a compound having the formula

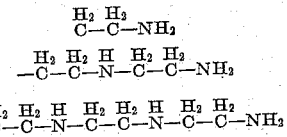

wherein R is a divalent aliphatic hydrocarbon radical having from 2 to 20 carbon atoms, and A is H.

3. As a new composition of matter, a compound having the formula

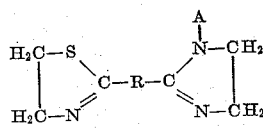

wherein R is the alkylene radical $-(CH_2)_7-$, and A is H.

4. As a new composition of matter, a compound having the formula

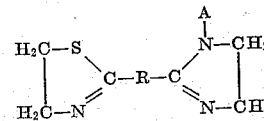

wherein R is a phenylene radical having from 2 to 20 carbon atoms, and A is H.

5. As a new composition of matter, a compound having the formula

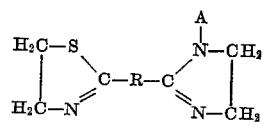

wherein R is the radical

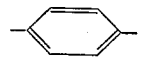

and A is H.

6. The process of reducing the corrosion of metals when exposed to the corrosive action of corrosive fluids which comprises introducing into said corrosive fluids a small quantity sufficient to substantially inhibit corrosion of an inhibitor having the formula

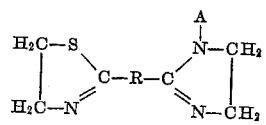

wherein R is a divalent hydrocarbon radical having from 2 to 20 carbon atoms, and A is a member of the group consisting of: H,

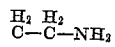

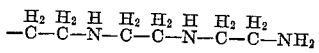

7. The process of reducing the corrosion of metals when exposed to the corrosive action of corrosive fluids which comprises introducing into said corrosive fluids a small quantity sufficient to substantially inhibit corrosion of an inhibitor having the formula

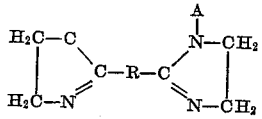

wherein R is a divalent aliphatic hydrocarbon radical having from 2 to 20 carbon atoms, and A is

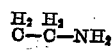

8. The process of reducing the corrosion of metals when exposed to the corrosive action of corrosive fluids which comprises introducing into said corrosive fluids a small quantity sufficient to substantially inhibit corrosion of an inhibitor having the formula

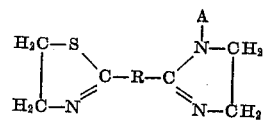

wherein R is $-(CH_2)_5-$ and A is

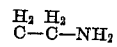

9. The process of reducing the corrosion of metals when exposed to the corrosive action of corrosive fluids which comprises introducing into said corrosive fluids a small quantity sufficient to substantially inhibit corrosion of an inhibitor having the formula

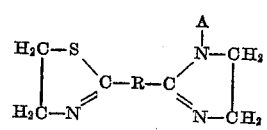

wherein R is a phenylene radical having from 2 to 20 carbon atoms, and A is

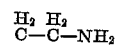

10. The process of reducing the corrosion of metals when exposed to the corrosive action of corrosive fluids which comprises introducing into said corrosive fluids a small quantity sufficient to substantially inhibit corrosion of an inhibitor having the formula

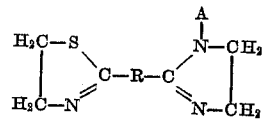

wherein R is $$-\underset{}{\bigcirc}-$$

and A is

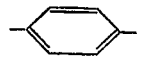

No references cited.

UNITED STATES PATENT OFFICE
Certificate of Correction

Patent No. 2,851,426                                                   September 9, 1958

William B. Hughes

It is hereby certified that error appears in the printed specification of the above numbered patent requiring correction and that the said Letters Patent should read as corrected below.

Column 9, lines 41 to 45, the formula should read as shown below instead of as in the patent—

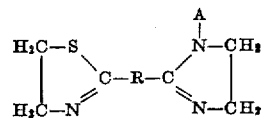

Signed and sealed this 4th day of November 1958.

[SEAL]

Attest:
KARL H. AXLINE,
*Attesting Officer.*

ROBERT C. WATSON,
*Commissioner of Patents.*